United States Patent
Zhou et al.

(10) Patent No.: US 11,027,576 B2
(45) Date of Patent: Jun. 8, 2021

(54) DEVICE FOR CONTROLLING TEMPERATURE OF HUB

(71) Applicant: CITIC DICASTAL CO., LTD, Hebei (CN)

(72) Inventors: Ruixiao Zhou, Hebei (CN); Zhiyuan Yu, Hebei (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 266 days.

(21) Appl. No.: 16/362,163

(22) Filed: Mar. 22, 2019

(65) Prior Publication Data

US 2019/0322131 A1 Oct. 24, 2019

(30) Foreign Application Priority Data

Mar. 23, 2018 (CN) .......................... 201810244556.3

(51) Int. Cl.
| | |
|---|---|
| *B60B 27/00* | (2006.01) |
| *F03D 9/11* | (2016.01) |
| *F03D 9/32* | (2016.01) |
| *B60B 35/02* | (2006.01) |
| *B60B 37/10* | (2006.01) |
| *B60R 16/033* | (2006.01) |

(52) U.S. Cl.
CPC ...... *B60B 27/0047* (2013.01); *B60B 27/0068* (2013.01); *B60B 35/02* (2013.01); *B60B 37/10* (2013.01); *B60R 16/033* (2013.01); *F03D 9/11* (2016.05); *F03D 9/32* (2016.05); *B60B 2900/212* (2013.01); *B60B 2900/513* (2013.01); *F05B 2260/42* (2013.01)

(58) Field of Classification Search
CPC ............ B60B 27/0015; B60B 27/0047; B60B 27/0068; B60B 35/00; B60B 35/001; B60B 35/02; B60B 35/003; B60B 35/35; B60B 35/004; B60B 35/025; B60B 35/04; B60B 35/06; B60B 35/08; B60B 37/10; B60B 2360/104; B60B 2900/1212; B60B 2900/212; B60B 2900/513; Y02E 10/72; Y02E 10/727; Y02E 10/728
See application file for complete search history.

(56) References Cited

U.S. PATENT DOCUMENTS 3,870,118 A * 3/1975 Klaue .................. F16D 65/853
                                                                                         188/3 H
4,668,267 A * 5/1987 Savary .................... C03C 25/12
                                                                                        65/519

(Continued)

*Primary Examiner* — Jianying C Atkisson
*Assistant Examiner* — Jose O Class-Quinones
(74) *Attorney, Agent, or Firm* — IPro, PLLC; Qian Gu

(57) ABSTRACT

A device for controlling the temperature of a hub includes a hub bearing mounted at a central hole of the hub, an axle mounted in the central hole through the hub bearing, an end cover mounted on a wheel disc outside the hub bearing, a temperature sensor, a water return passage, a motor, a turbine, a water storage tank, a water outlet passage, a wind driven generator, a rectifier, a battery, a controller and other components, wherein the water storage tank is arranged inside the axle and connected to the water outlet passage and the water return passage, the water passages are arranged inside the axle and connected to fluid, the turbine is arranged at the bottom of the water storage tank, and the turbine is driven by the motor at the bottom of the water storage tank.

7 Claims, 1 Drawing Sheet

(56) References Cited

U.S. PATENT DOCUMENTS

| | | | | |
|---|---|---|---|---|
| 4,815,573 A | * | 3/1989 | Miyata | B60T 1/065 188/264 D |
| 6,357,558 B1 | * | 3/2002 | Case | F03C 1/0403 188/170 |
| 7,055,667 B2 | * | 6/2006 | Roe | F16D 25/061 192/69.41 |
| 2007/0020109 A1 | * | 1/2007 | Takahashi | H02K 9/26 417/48 |
| 2007/0182241 A1 | * | 8/2007 | Dombroski | B60B 27/02 301/108.1 |
| 2009/0050424 A1 | * | 2/2009 | Bares | F16D 65/78 188/264 R |
| 2010/0148514 A1 | * | 6/2010 | Sato | F03D 80/60 290/55 |
| 2011/0217169 A1 | * | 9/2011 | Becker | F03D 9/14 416/95 |
| 2011/0254279 A1 | * | 10/2011 | Ventzke | H02K 7/1838 290/55 |
| 2012/0269625 A1 | * | 10/2012 | Sabhapathy | F03D 80/60 416/1 |
| 2013/0038065 A1 | * | 2/2013 | Versteeg | H02K 7/116 290/53 |
| 2014/0087906 A1 | * | 3/2014 | Keeney | B60K 1/00 475/150 |
| 2015/0017000 A1 | * | 1/2015 | Sato | F16C 27/02 416/174 |
| 2015/0192109 A1 | * | 7/2015 | Okazaki | F03D 9/18 290/55 |
| 2016/0009148 A1 | * | 1/2016 | Berkness | B60B 27/0047 152/417 |
| 2016/0201650 A1 | * | 7/2016 | Okazaki | F03D 1/06 290/44 |

* cited by examiner

DEVICE FOR CONTROLLING TEMPERATURE OF HUB

CROSS REFERENCE TO RELATED APPLICATION

This application claims priority to Chinese Patent Application No. 201810244556.3, entitled DEVICE FOR CONTROLLING TEMPERATURE OF HUB and filed on Mar. 23, 2018, which is incorporated herein by reference for all purposes.

FIELD OF THE INVENTION

The present invention relates to the technical field of hubs, in particular to an intelligent cooling device for a hub bearing.

BACKGROUND OF THE INVENTION

The hub bearing is an important part of automotive load and rotation, and its performance directly determines the overall performance of an automobile. When the hub is operated for a long time under severe conditions, the temperature of the hub bearing rises sharply. When the temperature of the hub bearing rises, the gap between the ferrule and the rolling element is drastically reduced, the friction coefficient is increased, the frictional force is increased, and the amount of heat generation is larger, forming a vicious circle. Adding a lubricant to the hub bearing can alleviate the heat of the bearing to a certain extent, but the lubricant is lost after a certain period of use, and the maintenance is improper, thus losing the protection on the hub bearing. Therefore, the invention of a hub system capable of achieving intelligent cooling is of great significance for the normal use of the wheel.

SUMMARY OF THE INVENTION

Accordingly, the present invention is directed to provide a device for cooling an aluminum alloy hub. The present invention is directed to provide an intelligent cooling device for a hub bearing for the problem of heat generation of a hub bearing. The present invention controls the temperature of the hub bearing in real time based on the principle of water cooling by establishing a temperature closed loop.

In order to achieve the above objective, the technical solution of the present invention is: an intelligent cooling device for a hub bearing comprises a hub, a hub bearing, an axle, an end cover, a temperature sensor, a water return passage, a motor, a turbine, a water storage tank, cooling water, a water outlet passage, a wind driven generator, a rectifier, a battery, a controller and other components. The water storage tank is arranged in the center of the axle, and a sufficient amount of cooling water is stored in the water storage tank. The cooling water flows out of the water outlet passage and then flows back from the water return passage, and the water outlet passage and the water return passage are designed to be spiral in the hub bearing. The turbine is arranged at the bottom of the water storage tank to push the cooling water to flow. The turbine is driven by the motor arranged at the bottom of the water storage tank. The energy of the motor is provided by the wind driven generator. The wind driven generator is arranged inside the axle, and a vent hole is formed in the axle opposite to the wind driven generator. The alternating current generated by the wind driven generator is converted into direct current by the rectifier, and then the direct current is stored in the battery. In order to realize an intelligent cooling function, the controller and the temperature sensor are provided for forming a temperature closed loop to control the temperature of the hub bearing in real time. The temperature sensor is embedded in the axle and is in contact with an inner ring of the hub bearing. Thus, when the temperature of the hub bearing rises, the temperature sensor transmits its temperature signal to the controller, the controller controls the motor to drive the turbine to push the cooling water out of the water storage tank, and the cooling water is cooled by the hub bearing and then flows back to the water storage tank.

In one aspect of the present invention, a device for controlling the temperature of a hub, comprising a hub bearing, an axle, an end cover, a water return passage, a motor, a turbine, a water storage tank, and a water outlet passage the hub bearing is mounted at a central hole of the hub, the axle is mounted in the central hole through the hub bearing, the end cover is mounted on a wheel disc outside the hub bearing; the water storage tank is arranged inside the axle and connected to the water outlet passage and the water return passage, the water outlet passage and the water return passage are connected fluidly; the turbine is arranged at the bottom of the water storage tank, and the turbine is driven by the motor at the bottom of the water storage tank.

The device further comprises a wind driven generator inside the axle with a hollow structure and a rectifier connected with the wind driven generator, wherein the center of the axle is connected to the outer side of the surface of the wheel disc; and the wind driven generator is connected to the motor and drives the operation of the motor.

The device further comprises a battery connected to the wind driven generator and the motor, and the battery is configured to obtain electrical energy from the wind driven generator and store the same, and drive the motor to run.

The device further comprises a controller and a temperature sensor; the temperature sensor is connected to the controller and transmits a temperature signal to the controller; and the controller is configured to control the operation of the motor.

The temperature sensor is embedded in the axle and is in contact with an inner ring of the hub bearing.

At least a part of the outlet passage and a part of the return passage are located inside the axle and exposed to an air outlet of the wind driven generator.

The surfaces of the outlet passage and the return passage are provided with threads having a depth of 0.2-0.6 mm, a pitch of 15-25 mm and a width of 2-5 mm, and at least 10-15 cm of the outlet passage and the return passage are exposed to the interior of the axle and the air outlet of the wind driven generator.

In other aspect of the present invention, the following technical solution is further provided: the water storage tank is arranged in the center of the axle, and a sufficient amount of cooling water is stored in the water storage tank. The cooling water flows out of the water outlet passage and then flows back from the water return passage, and the water outlet passage and the water return passage are designed to be spiral in the hub bearing. The turbine is arranged at the bottom of the water storage tank to push the cooling water to flow. The turbine is driven by the motor arranged at the bottom of the water storage tank. The energy of the motor is provided by the wind driven generator. The wind driven generator is arranged inside the axle, and a vent hole is formed in the axle opposite to the wind driven generator. The alternating current generated by the wind driven generator is converted into direct current by the rectifier, and then the direct current is stored in the battery. The present invention adopts the principle of water cooling to intelligently cool the hub bearing, has high degree of automation, and is particularly suitable for the hub bearing under the high speed and heavy load condition.

BRIEF DESCRIPTION OF THE DRAWING

The embodiments of the present invention will be described in detail below in combination with the accompanying drawing, in which.

Figure 1:
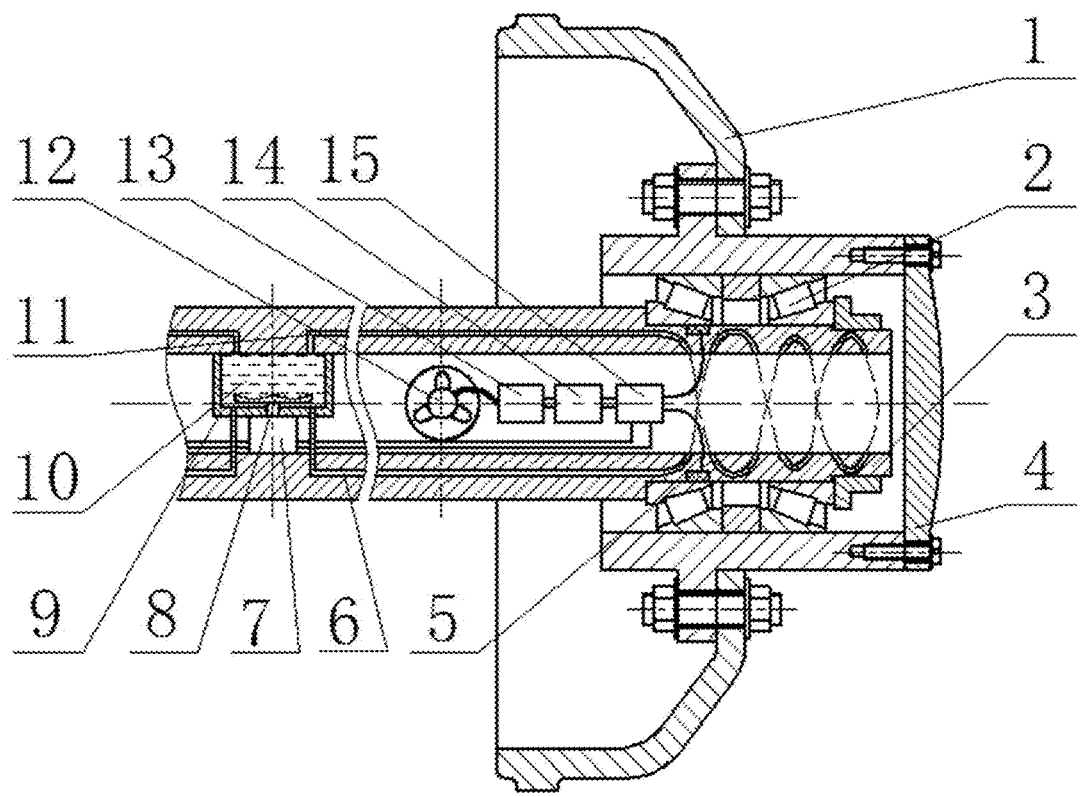
FIG. 1 is a structure diagram of an intelligent cooling device for a hub bearing.

In which: 1 hub, 2 hub bearing, 3 axle, 4 end cover, 5 temperature sensor, 6 water return passage, 7 motor, 8 turbine, 9 water storage tank, 10 cooling water, 11 water outlet passage, 12 wind driven generator, 13 rectifier, 14 battery, 15 controller.

DETAILED DESCRIPTION OF EMBODIMENTS

Embodiment 1

The present invention will be further illustrated below in conjunction with the drawing and specific embodiments.

As shown in FIG. 1, an intelligent cooling device for a hub bearing according to the present invention comprises a hub 1, a hub bearing 2, an axle 3, an end cover 4, a temperature sensor 5, a water return passage 6, a motor 7, a turbine 8, a water storage tank 9, cooling water 10, a water outlet passage 11, a wind driven generator 12, a rectifier 13, a battery 14, a controller 15 and other components. The water storage tank 9 is arranged in the center of the axle 3, and a sufficient amount of cooling water 10 is stored in the water storage tank 9. The cooling water 10 flows out of the water outlet passage 11 and then flows back from the water return passage 6, and the outlet water passage 11 and the water return passage 6 are designed to be spiral in the hub bearing 2. The turbine 8 is arranged at the bottom of the water storage tank 9 to push the cooling water 10 to flow. The turbine 8 is driven by the motor 7 arranged at the bottom of the water storage tank 9. The energy of the motor 7 is provided by the wind driven generator 12. The wind driven generator 12 is arranged inside the axle 3, and a vent hole is formed in the axle 3 opposite to the wind driven generator 12. The alternating current generated by the wind driven generator 12 is converted into direct current by the rectifier 13, and then the direct current is stored in the battery 14. In order to realize an intelligent cooling function, the controller 15 and the temperature sensor 5 are provided for forming a temperature closed loop to control the temperature of the hub bearing 2 in real time. The temperature sensor 5 is embedded in the axle 3 and is in contact with an inner ring of the hub bearing 2. Thus, when the temperature of the hub bearing 2 rises, the temperature sensor 5 transmits its temperature signal to the controller 15, the controller 15 controls the motor 7 to drive the turbine 8 to push the cooling water 10 out of the water storage tank 9, and the cooling water 10 is cooled by the hub bearing 2 and then flows back to the water storage tank 9.

In a preferred embodiment of the present invention, the surface of the outlet passage and the return passage are engraved with threads having a depth of 0.35 mm, a pitch of 18 mm and a width of 3 mm, and at least 12 cm of the outlet passage and the return passage are exposed to the interior of the axle and an air outlet of the wind driven generator.

As a parallel test, a test group with threads on the surfaces of passages and a control group without threads were respectively arranged on a left front wheel and a right front wheel of an automobile. The test shows that the temperature (42.8° C.) of the former cooling water at the outlet of the outlet passage is 7.5° C. lower than the latter (50.3° C.) after 3 hours of driving under summer exposure conditions.

The invention claimed is:

1. A device for controlling the temperature of a hub, comprising:
a hub bearing, an axle, an end cover, a water return passage, a motor, a turbine, a water storage tank, and a water outlet passage, wherein the hub bearing is mounted at a central hole of the hub, the axle is mounted in the central hole through the hub bearing, and the end cover is mounted on a wheel disc outside the hub bearing, the water storage tank is arranged inside the axle and connected to the water outlet passage and the water return passage, the water outlet passage and the water return passage are connected fluidly, the turbine is arranged at the bottom of the water storage tank, and the turbine is driven by the motor at the bottom of the water storage tank.

2. The device for controlling the temperature of a hub according to claim 1, further comprises:
a wind driven generator inside the axle with a hollow structure and a rectifier connected with the wind driven generator, wherein the center of the axle is connected to an outer side of the surface of the wheel disc, and wherein the wind driven generator is connected to the motor and drives the operation of the motor.

3. The device for controlling the temperature of a hub according to claim 1, further comprising:
a battery connected to the wind driven generator and the motor, and wherein the battery is configured to obtain and store electrical energy from the wind driven generator, and drive the motor to run.

4. The device for controlling the temperature of a hub according to claim 1, further comprising:
a controller and a temperature sensor connected to the controller and configured to transmit a temperature signal to the controller, and wherein the controller is configured to control the operation of the motor.

5. The device for controlling the temperature of a hub according to claim 4, wherein the temperature sensor is embedded in the axle and is in contact with an inner ring of the hub bearing.

6. The device for controlling the temperature of a hub according to claim 1, wherein at least a part of the outlet passage and a part of the return passage are located inside the axle and exposed to an air outlet of the wind driven generator.

7. The device for controlling the temperature of a hub according to claim 6, wherein the surfaces of the outlet passage and the return passage are provided with threads having a depth of 0.2 mm-0.6 mm, a pitch of 15 mm-25 mm and a width of 2 mm-5 mm, and at least 10 cm-15 cm of the outlet passage and the return passage are exposed to the interior of the axle and the air outlet of the wind driven generator.

\* \* \* \* \*